US008675724B2

(12) United States Patent
Peng et al.

(10) Patent No.: US 8,675,724 B2
(45) Date of Patent: Mar. 18, 2014

(54) DECISION FEEDBACK EQUALIZERS AND OPERATING METHODS THEREOF

(75) Inventors: Yung-Chow Peng, Hsinchu (TW); Yu-Chun Lin, Xinying (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 372 days.

(21) Appl. No.: 12/836,999

(22) Filed: Jul. 15, 2010

(65) Prior Publication Data

US 2011/0090947 A1   Apr. 21, 2011

Related U.S. Application Data

(60) Provisional application No. 61/253,311, filed on Oct. 20, 2009.

(51) Int. Cl.
*H03K 5/159*   (2006.01)

(52) U.S. Cl.
USPC .......... 375/233; 375/229; 375/232; 375/316; 375/346; 375/348

(58) Field of Classification Search
USPC .................. 375/233, 229, 232, 316, 346, 348
See application file for complete search history.

(56) References Cited

U.S. PATENT DOCUMENTS

| | | | |
|---|---|---|---|
| 7,330,068 B2 | 2/2008 | Barksdale | |
| 7,426,236 B1 | 9/2008 | He | |
| 7,987,396 B1 * | 7/2011 | Riani et al. ................ | 714/704 |
| 2004/0044713 A1 | 3/2004 | Healey et al. | |
| 2005/0135475 A1 | 6/2005 | Momtaz et al. | |
| 2005/0135510 A1 | 6/2005 | Momtaz | |
| 2006/0146926 A1 | 7/2006 | Bhoja et al. | |
| 2009/0135035 A1 | 5/2009 | Fifield | |

FOREIGN PATENT DOCUMENTS

| | | |
|---|---|---|
| CN | 1213898 | 4/1999 |
| CN | 1878153 | 12/2006 |
| CN | 1909422 | 2/2007 |
| CN | 101119185 | 2/2008 |
| TW | I236212 | 7/2005 |
| TW | I258085 | 7/2006 |

OTHER PUBLICATIONS

Meghelli, M., et al., "A 10Gb/s 5-Tap-DFE/4-Tap-FFEE Transceiver in 90nm CMOS", ISSCC 2006, Session 4, Gigabit Transceivers, 4.1.
Bulzacchelli, John F., et al., "A 10Gb/s 5-Tap-DFE/4-Tap-FFEE Transceiver in 90nm CMOS", IEEE Journal of Solid-State Circuits, vol. 41, No. 12, Dec. 2006, pp. 2885-2900.

(Continued)

*Primary Examiner* — Leila Malek
(74) *Attorney, Agent, or Firm* — Lowe Hauptman & Ham, LLP

(57) ABSTRACT

A method for updating a tap coefficient of a decision feedback equalizer is provided. The method includes sampling a first input signal received by a sampler of a decision feedback equalizer. It is determined if an amplitude of the first input signal falls within a range defined between a first predetermined voltage level and a second predetermined voltage level. If the amplitude of the first input signal falls outside the range, a tap coefficient is updated to generate an updated tap coefficient that is fed back to adjust an amplitude of a second input signal received at an input end of the decision feedback equalizer. If the amplitude of the first input signal falls within the range, the tap coefficient is free from being updated.

20 Claims, 10 Drawing Sheets

(56) References Cited

OTHER PUBLICATIONS

Office Action dated Dec. 5, 2012 from corresponding application No. CN201010518061.9.

Office Action dated Jun. 3, 2013 from corresponding application No. CN 201010518061.9.

Office Action dated Oct. 15, 2013 from corresponding application No. TW 099135703.

* cited by examiner

| Outp+ | Outp- | Sign_0(b0) and Sign_0(b1) |
|---|---|---|
| Amplitude larger than the first predetermined voltage level | Amplitude larger than the second predetermined voltage level | (0,1) |
| Amplitude smaller than the first predetermined voltage level | Amplitude larger than the second predetermined voltage level | (0,0) |
| Amplitude smaller than the first predetermined voltage level | Amplitude smaller than the second predetermined voltage level | (1,1) |

FIG. 4A

| Outp+ | Outp− | Outn+ | Outn− | Sign_0(b0) and Sign_0(b1) |
|---|---|---|---|---|
| Amplitude larger than the first predetermined voltage level | Amplitude larger than the second predetermined voltage level | Amplitude larger than the third predetermined voltage level | Amplitude larger than the fourth predetermined voltage level | (0,1) |
| Amplitude smaller than the first predetermined voltage level | Amplitude larger than the second predetermined voltage level | Amplitude larger than the third predetermined voltage level | Amplitude larger than the fourth predetermined voltage level | (0,0) |
| Amplitude smaller than the first predetermined voltage level | Amplitude smaller than the second predetermined voltage level | Amplitude larger than the third predetermined voltage level | Amplitude larger than the fourth predetermined voltage level | (1,1) |
| Amplitude smaller than the first predetermined voltage level | Amplitude smaller than the second predetermined voltage level | Amplitude smaller than the third predetermined voltage level | Amplitude larger than the fourth predetermined voltage level | (0,0) |
| Amplitude smaller than the first predetermined voltage level | Amplitude smaller than the second predetermined voltage level | Amplitude smaller than the third predetermined voltage level | Amplitude smaller than the fourth predetermined voltage level | (0,1) |

FIG. 7A

DECISION FEEDBACK EQUALIZERS AND OPERATING METHODS THEREOF

CROSS-REFERENCE TO RELATED APPLICATIONS

The present application claims priority of U.S. Provisional Patent Application Ser. No. 61/253,311, filed on Oct. 20, 2009, which is incorporated herein by reference in its entirety.

TECHNICAL FIELD

The present disclosure relates generally to the field of semiconductor circuits, and more particularly, to decision feedback equalizers and operating methods thereof.

BACKGROUND

As semiconductor process technology progresses, IC chips can operate at greater speed and offer greater processing power. This places a greater demand for data rate of I/O (input/output) signals, so that maximum system-level performance can be realized. I/O signals may be transmitted in interchip links such as central processing unit (CPU) memory applications, and long-range backplane or coax links that arise in systems such as scalable multiple-processor servers and high-speed routers/switches. The long-range applications are particularly challenging to realize robust high-speed I/O transmission due to the combined effects of increased transmission line loss, crosstalk, and signal distortion arising from reflections that occur as data rates move into the microwave frequency range of operation and beyond.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the numbers and dimensions of the various features may be arbitrarily increased or reduced for clarity of discussion.

FIG. 4A illustrates a table showing relationships between the sign signals Sign_0(b0) and Sign_0(b1) and the comparison results Outp+ and Outp−.

FIG. 7A illustrates another table showing relationships between the sign signals Sign_0(b0) and Sign_0(b1) and the comparison results Outp+, Outp−, Outn+, and Outn−.

DETAILED DESCRIPTION

Figure 1:
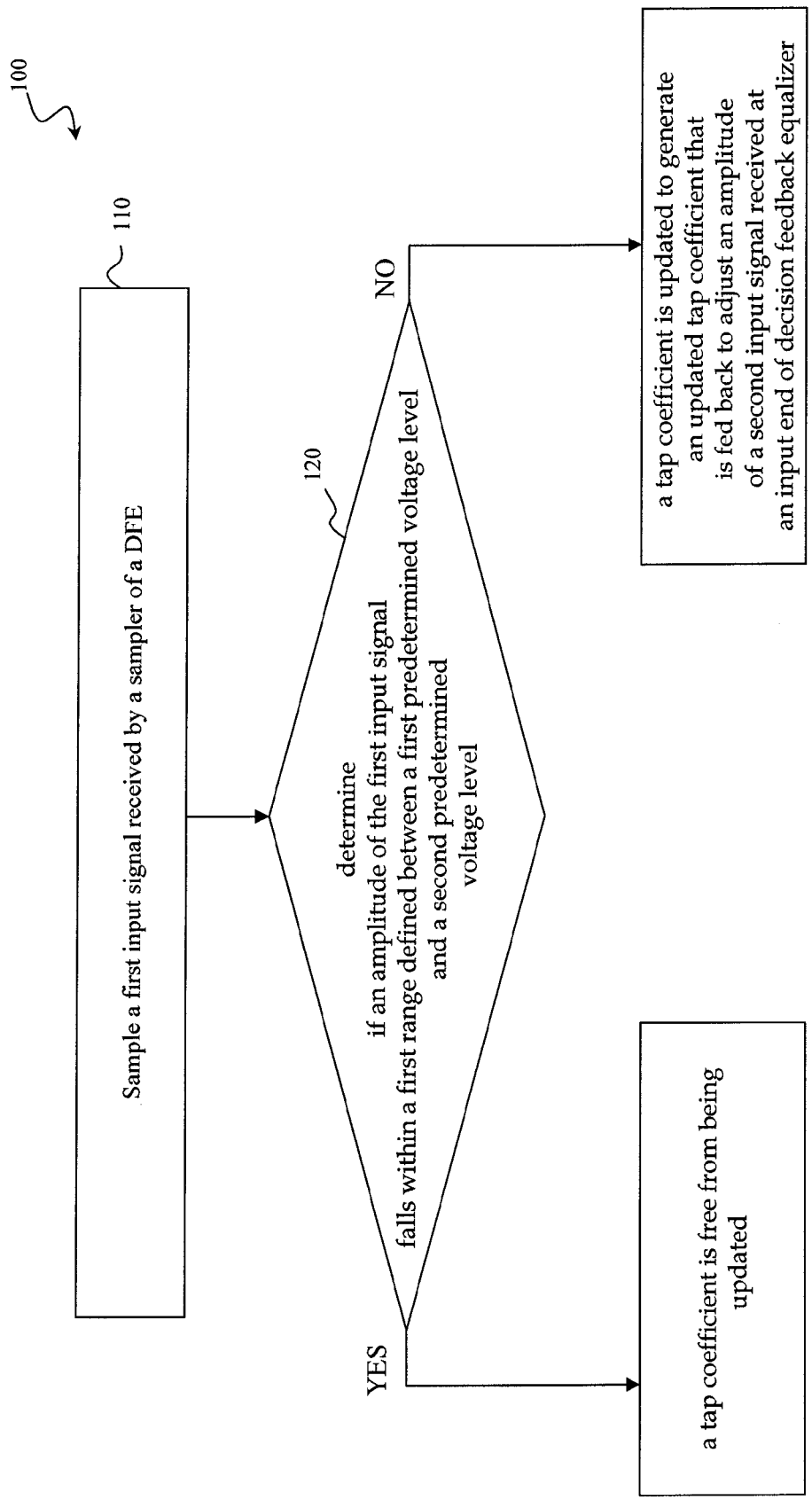
FIG. 1 is a schematic drawing illustrating an exemplary method for updating a tap coefficient of a decision feedback equalizer (DFE).

To enable reliable signal transmissions, the I/O core architecture can employ some form of line equalization. A common approach to equalization for data rate up to 3-4 Gb/s is a feed-forward equalizer (FFE) at the transmitter, which pre-distorts the signal such that it is recovered at the receiver with a desired shape suitable for reliable data detection. Another form of equalizer is a decision feedback equalizer (DFE) that operates by subtracting the intersymbol interference (ISI) arising from previously detected data symbols from the symbol currently being received.

During a normal operation, the conventional DFE uses reference voltages $V_{ref}$ and $-V_{ref}$ to determine if an amplitude of an input signal is larger and/or smaller than the reference voltages $V_{ref}$ and $-V_{ref}$. If the amplitude of the input signal is larger or smaller than both of the reference voltages $V_{ref}$ and $-V_{ref}$, the conventional DFE updates a tap coefficient that is fed back to reduce an amplitude of an incoming signal. If the amplitude of the input signal is smaller than the reference voltages $V_{ref}$ and larger than the reference voltage $-V_{ref}$, the conventional DFE updates a tap coefficient that is fed back to increase an amplitude of an incoming signal.

It is found that before the normal operation, a training sequence is applied to the conventional DFE to compensate a channel loss. Without the training sequence, applications, e.g., peripheral component interconnect express (PCI-E), of the conventional DFE may be locked in a wrong direction. The tap coefficients generated by the conventional DFE can be updated in a wrong way that may adversely affect the normal operation of the conventional DFE.

To avoid the training sequence, another conventional DFE uses an eye detector to monitor amplitude changes of input signals. However, the structure of the conventional DFE with the eye detector is too complicated and the size of the conventional DFE increases by 50% or more. The conventional DFE with the eye detector also needs additional timing control to adjust a sampling position.

Based on the foregoing, DFEs and methods for updating the tap coefficients of the DFEs are desired.

It is understood that the following disclosure provides many different embodiments, or examples, for implementing different features. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "lower," "upper," "horizontal," "vertical," "above," "below," "up," "down," "top," "bottom," etc. as well as derivatives thereof (e.g., "horizontally," "downwardly," "upwardly," etc.) are used for ease of the present disclosure of one features relationship to another feature. The spatially relative terms are intended to cover different orientations of the device including the features.

FIG. 1 is a schematic drawing illustrating an exemplary method for updating a tap coefficient of a decision feedback equalizer (DFE). In FIG. 1, a method 100 for updating a tap coefficient of a DFE can include sampling a first input signal received by a sampler of the DFE (step 110). The method 100 can include determining if an amplitude of the first input signal falls within a range defined between a first predetermined voltage level and a second predetermined voltage level (step 120). If the amplitude of the first input signal falls outside the range, the tap coefficient is updated to generate an updated tap coefficient that is fed back to adjust an amplitude of a second input signal received from the input end of the DFE (step 130). If the amplitude of the first input signal falls within the range, the tap coefficient is free from being updated (step 140).

In some embodiments, the first predetermined voltage level can be equal to a reference voltage $V_{ref}$ plus a predetermined voltage V, e.g., $V_{ref}+V$. The second predetermined voltage level can be equal to a reference voltage $V_{ref}$ minus a predetermined voltage V, e.g., $V_{ref}-V$. The predetermined voltage V can have a value between about 0.2 $V_{ref}$ and about 0.4 $V_{ref}$. In some embodiments, by using the range between the predetermined voltage levels $V_{ref}+V$ and $V_{ref}-V$, the method 100 can achieve a desired deviation of frequency response of about 3.1 dB.

In some other embodiments, the first predetermined voltage level can be equal to a reference voltage $-V_{ref}$ plus a predetermined voltage V, e.g., $-V_{ref}+V$. The second predetermined voltage level can be equal to a reference voltage $-V_{ref}$ minus a predetermined voltage V, e.g., $-V_{ref}-V$. The predetermined voltage V can have a value between about 0.2 $V_{ref}$ and about 0.4 $V_{ref}$.

In some embodiments, the method 100 can include determining if the updated tap coefficient is larger than a predetermined value, e.g., 0. If the updated tap coefficient is no more than the predetermined value, the updated tap coefficient can be fed back to adjust the amplitude of the second input signal. If the updated coefficient is more than the predetermined value, the updated tap coefficient can be clamped at the predetermined value. Since the method 100 can include clamping the updated tap coefficient, applications of the DFE that is locked in the wrong direction can be desirably avoided. By clamping the updated tap coefficient, the method 100 can be free from including a training sequence for the DFE.

In some other embodiments, an exemplary method for updating a tap coefficient of a DFE can include sampling a first input signal received by a sampler of the DFE. The method can include compare an amplitude of the first input signal with a first range defined between a first predetermined voltage level and a second predetermined voltage level and with a second range defined between a third predetermined voltage level and a fourth predetermined voltage level. If the amplitude of the first input signal falls outside the first range and the second range, a tap coefficient is updated to generate an updated tap coefficient that is fed back to adjust an amplitude of a second input signal received at an input end of the DFE. If the amplitude of the first input signal falls within the first range or the second range, the tap coefficient is free from being updated.

In at least one embodiment, the first predetermined voltage level can be equal to a reference voltage $V_{ref}$ plus a predetermined voltage V, e.g., $V_{ref}+V$. The second predetermined voltage level can be equal to a reference voltage $V_{ref}$ minus a predetermined voltage V, e.g., $V_{ref}-V$. The third predetermined voltage level can be equal to a reference voltage $-V_{ref}$ plus a predetermined voltage V, e.g., $-V_{ref}+V$. The fourth predetermined voltage level can be equal to a reference voltage $-V_{ref}$ minus a predetermined voltage V, e.g., $-V_{ref}-V$. The predetermined voltage V can have a value between about 0.2 $V_{ref}$ and about 0.4 $V_{ref}$.

Figure 2:
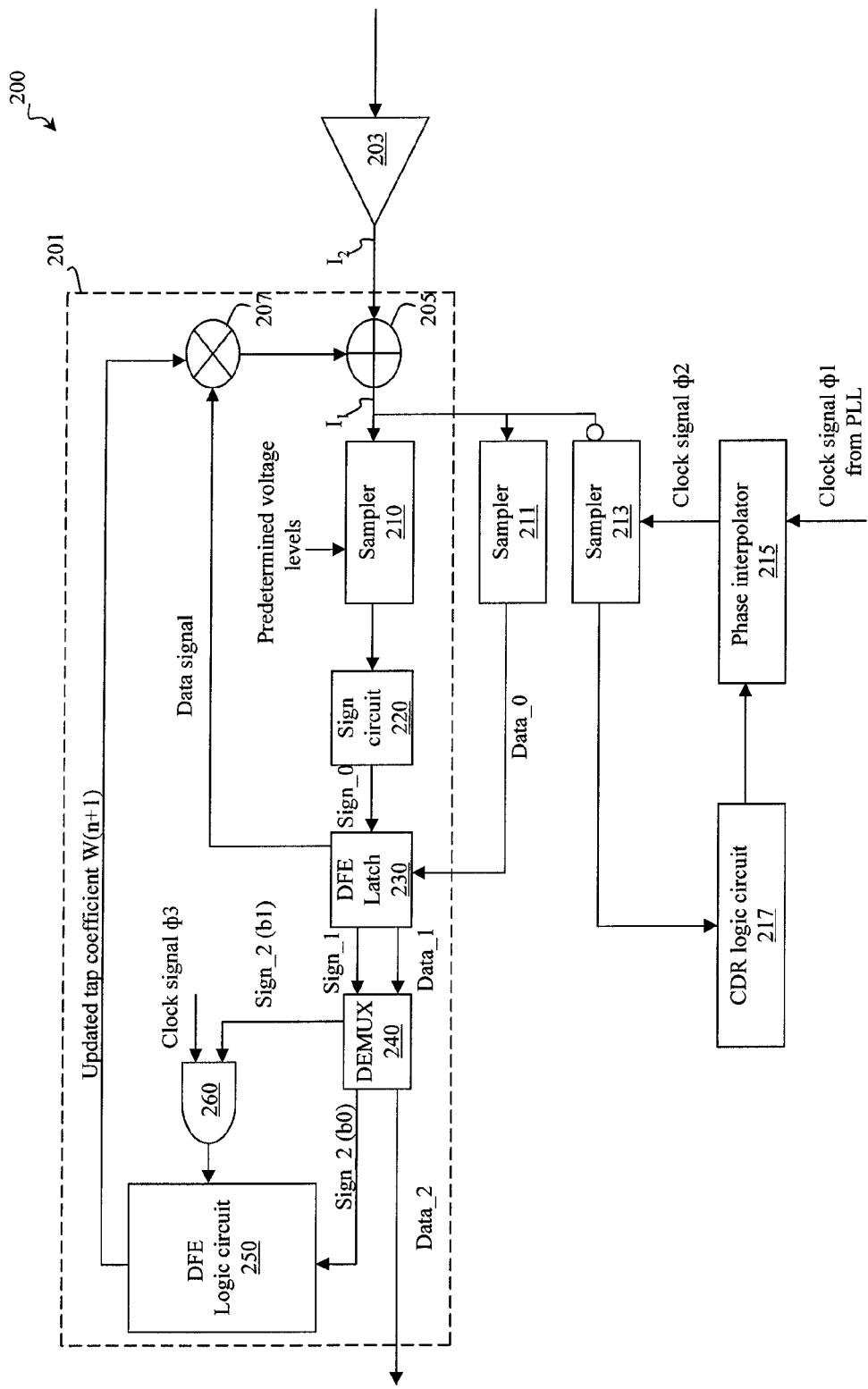
FIG. 2 is a schematic drawing illustrating an integrated circuit including an exemplary DFE.

FIG. 2 is a schematic drawing illustrating an integrated circuit including an exemplary DFE. In FIG. 2, an integrated circuit 200, including a receiver or a transceiver, can include a DFE 201, an amplifier 203, samplers 211 and 213, a clock data recovery (CDR) logic circuit 217, and a phase interpolator 215. It is noted that the configuration of the integrated circuit 200 is merely exemplary. The scope of the invention is not limited thereto.

The amplifier 203 can be, for example, a radio frequency (RF) amplifier, an analog-to-digital amplifier, a digital-to-analog amplifier, or other amplifier. The amplifier 203 can amplify signals transmitted through channels, outputting amplified signals to the DFE 201.

The samplers 211 and 213 can be coupled with the DFE 201. Each of the samplers 211 and 213 can receive an input signal $I_1$. The sampler 211 can sample the amplitude of the input signal $I_1$, outputting at least one data signal Data_0 to the DFE 201. The sampler 213 can sample a signal edge of the input signal $I_1$, outputting at least one signal to the CDR logic circuit 217.

The CDR logic circuit 217 can process the signal outputted from the sampler 213, outputting a signal to the phase interpolator 215. The phase interpolator 215 can receive and process the signal from the CDR logic circuit 217 and a clock signal $\phi 1$ from a phase lock loop (PLL), outputting a clock signal $\phi 2$ for controlling the sampler 213.

Referring to FIG. 2, the DFE 201 can include at least one sampler, e.g., a sampler 210. The sampler 210 can receive the input signal $I_1$. The sampler 210 can also receive predetermined voltage levels, e.g., a first predetermined voltage level and a second predetermined voltage level, which define a range. In some embodiments, the first predetermined voltage level can be equal to a reference voltage $V_{ref}$ plus a predetermined voltage V, e.g., $V_{ref}+V$. The second predetermined voltage level can be equal to a reference voltage $V_{ref}$ minus a predetermined voltage V, e.g., $V_{ref}-V$. The predetermined voltage V can have a value between about 0.2 $V_{ref}$ and about 0.4 $V_{ref}$. The sampler 210 can sampling the input signal $I_1$ for comparing the amplitude of the input signal $I_1$ with the predetermined voltage levels, outputting at least one comparison result.

Figure 3:
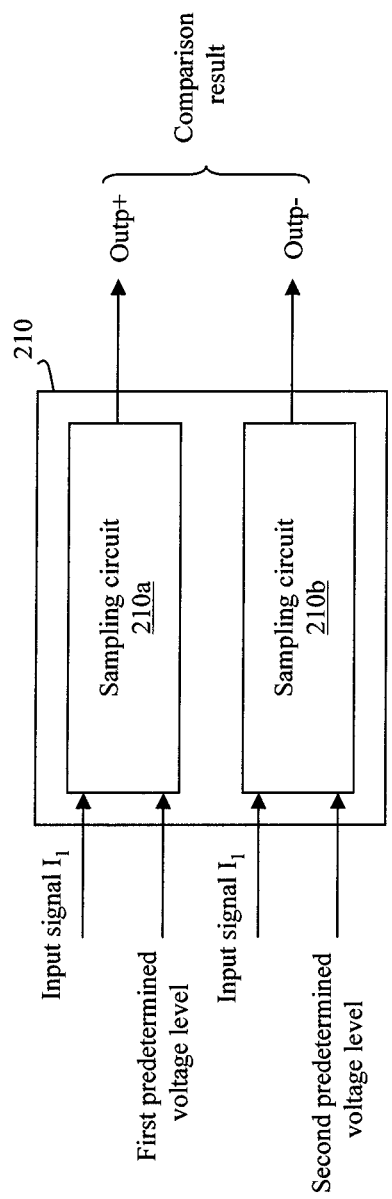
FIG. 3 is a schematic drawing illustrating an exemplary sampler for comparing the amplitude of the input signal with the predetermined voltage levels.

FIG. 3 is a schematic drawing illustrating an exemplary sampler for comparing the amplitude of the input signal with the predetermined voltage levels. In FIG. 3, the sampler 210 can include at least one sampling circuit, e.g., sampling circuits 210a and 210b. Each of the sampling circuits 210a and 210b can receive the input signal $I_1$. The sampling circuits 210a and 210b can receive the first predetermined voltage level and the second predetermined voltage level, respectively.

The sampling circuit 210a can compare the amplitude of the input signal $I_1$ and the first predetermined voltage level, outputting a comparison result Outp+. The sampling circuit 210b can compare the amplitude of the input signal $I_1$ and the second predetermined voltage level, outputting a comparison result Outp−. The comparison results Outp+ and Outp− can be outputted to a sign circuit 220 (shown in FIG. 2).

In FIG. 2, the sign circuit 220 can receive the comparison results Outp+ and Outp−, outputting at least one sign signal Sign_0, e.g., Sign_0($b$0) and Sign_0($b$1), corresponding to the comparison results Outp+ and Outp−. FIG. 4A illustrates a table showing relationships between the sign signals Sign_0 ($b$0) and Sign_0($b$1) and the comparison results Outp+ and Outp−. In some embodiments, if the amplitude of the input signal $I_1$ is larger than both of the first and second predetermined voltage levels, the sign circuit 220 can output the sign signals Sign_0($b$0) and Sign_0($b$1) having, for example, a low voltage state "0" and a high voltage state "1", respectively. A DFE logic circuit 250 can, corresponding to the sign signals Sign_0($b$0) and Sign_0($b$1), update a tap coefficient to generate an updated tap coefficient that is fed back to reduce an amplitude of an input signal $I_2$ received from the input end of the DFE 201.

If the amplitude of the input signal $I_1$ is smaller than the first predetermined voltage level and larger than the second predetermined voltage level, the sign circuit 220 can output the sign signals Sign_0($b$0) and Sign_0($b$1) having, for example, a low voltage state "0" and a low voltage state "0", respectively. The DFE logic circuit 250 is, corresponding to the sign signals Sign_0($b$0) and Sign_0($b$1), free from updating the tap coefficient.

If the amplitude of the input signal $I_1$ is smaller than both of the first and second predetermined voltage levels, the sign circuit 220 can output the sign signals Sign_0($b$0) and Sign_0 ($b$1) having, for example, a high voltage state "1" and a high voltage state "1", respectively. The DFE logic circuit 250 can, corresponding to the sign signals Sign_0($b$0) and Sign_0($b$1), update a tap coefficient to generate an updated tap coefficient that is fed back to increase the amplitude of an input signal $I_2$ received from the input end of the DFE 201.

Figure 4B:
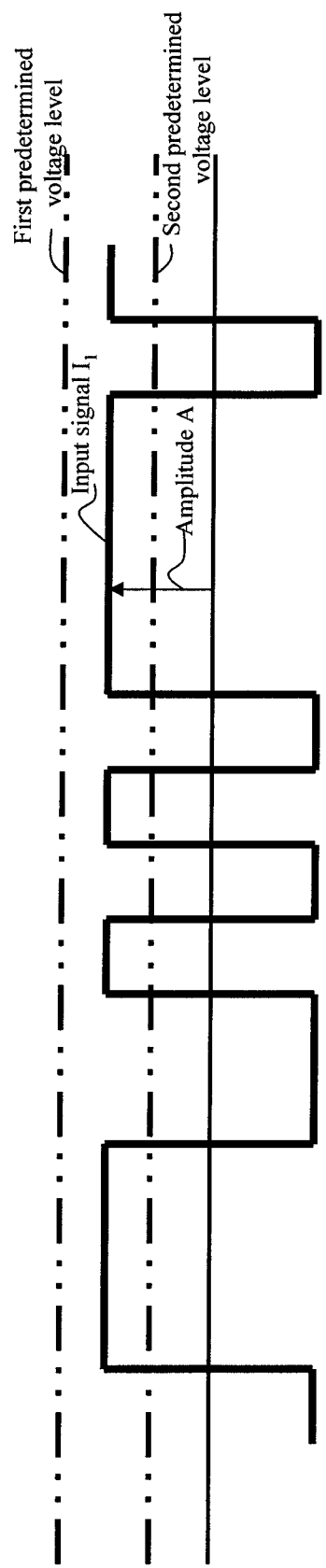
FIG. 4B is a schematic drawing illustrating an exemplary input signal having an amplitude between a first predetermined voltage level and a second predetermined voltage level.

For example, FIG. 4B illustrates the input signal $I_1$ has an amplitude "A". The amplitude "A" falls within the range between the first and second predetermined voltage levels. Based on the table shown in FIG. 4A, the sign circuit 220 can output the sign signals Sign_0($b$0) and Sign_0($b$1) having a low voltage state "0" and a low voltage state "0", respectively. The DFE logic circuit 250 is free from updating the tap coefficient.

Referring again to FIG. 2, in some embodiments, the DFE 201 can include a DFE latch 230. The DFE latch 230 can receive the sign signals Sign_0 from the sign circuit 220 and the data signals Data_0 from the sampler 211. The DFE latch 230 can latch the sign signals Sign_0 and the data signals Data_0, outputting sign signals Sign_1 and data signals Data_1, respectively, to a demultiplexer (DEMUX) 240. The DFE latch 230 can also output data signals to a multiplier 207.

The DEMUX 240 can receive and demultiplex the sign signals Sign_1 and the data signals Data_1, outputting sign signals Sign_2, e.g., Sign_2($b$0) and Sign_2($b$1), and the data signals Data_2, respectively. The sign signals Sign_2($b$0) and Sign_2($b$1) correspond to the sign signals Sign_0($b$0) and Sign_0($b$1), respectively. In some embodiments, the sign signals Sign_2($b$0) and Sign_2($b$1) can have voltage states as the sign signals Sign_0($b$0) and Sign_0($b$1), respectively.

In embodiments, the DEMUX 240 can output the sign signals Sign_2($b$0) and Sign_2($b$1) to the DFE logic circuit 250 and a logic gate 260, respectively. The DFE logic circuit 250 can receive and process the sign signal Sign_2($b$0), generating a measured tap coefficient W(n+1) based on a tap coefficient W(n). In some embodiments, the measurement of the tap coefficient can be based on formula (I) shown below.

$$W(n+1)=W(n)+\mu*\text{sign}(data)*\text{sign}(e(n)) \quad (1)$$

wherein, "μ" can represent a gradient of convergence, "data" can represent a DFE output, "n" can represent a discrete time step, and "e" can represent a sign error of the data.

The logic gate 260 can receive and process the sign signal Sign_2($b$1) and a clock signal φ3, outputting a control signal to control the DFE logic circuit 250. For example, the sign signal Sign_2($b$1) can have a high voltage state "1". The logic gate 260 can control the DFE logic circuit 250 to output the measured tap coefficient as an updated tap coefficient W(n+1) that is fed back to adjust the amplitude of the input signal $I_2$ received at the input end of the DFE 201. If the sign signal Sign_2($b$1) has a low voltage state "0". The logic gate 260 can control the DFE logic circuit 250 not to output the measured tap coefficient W(n+1). Since the measured tap coefficient W(n+1) is free from being outputted, the tap coefficient W(n) of the DFE 201 is free from being updated.

Referring again to FIG. 2, in some embodiments the updated tap coefficient W(n+1) can be fed back to the multiplier 207. The multiplier 207 can multiply the updated tap coefficient W(n+1) and the data signals from the DFE latch 230. The output from the multiplier 207 can be forwarded to an adder 205 for adjusting the amplitude of the input signal $I_2$ received at the input end of the DFE 201.

Figure 5:
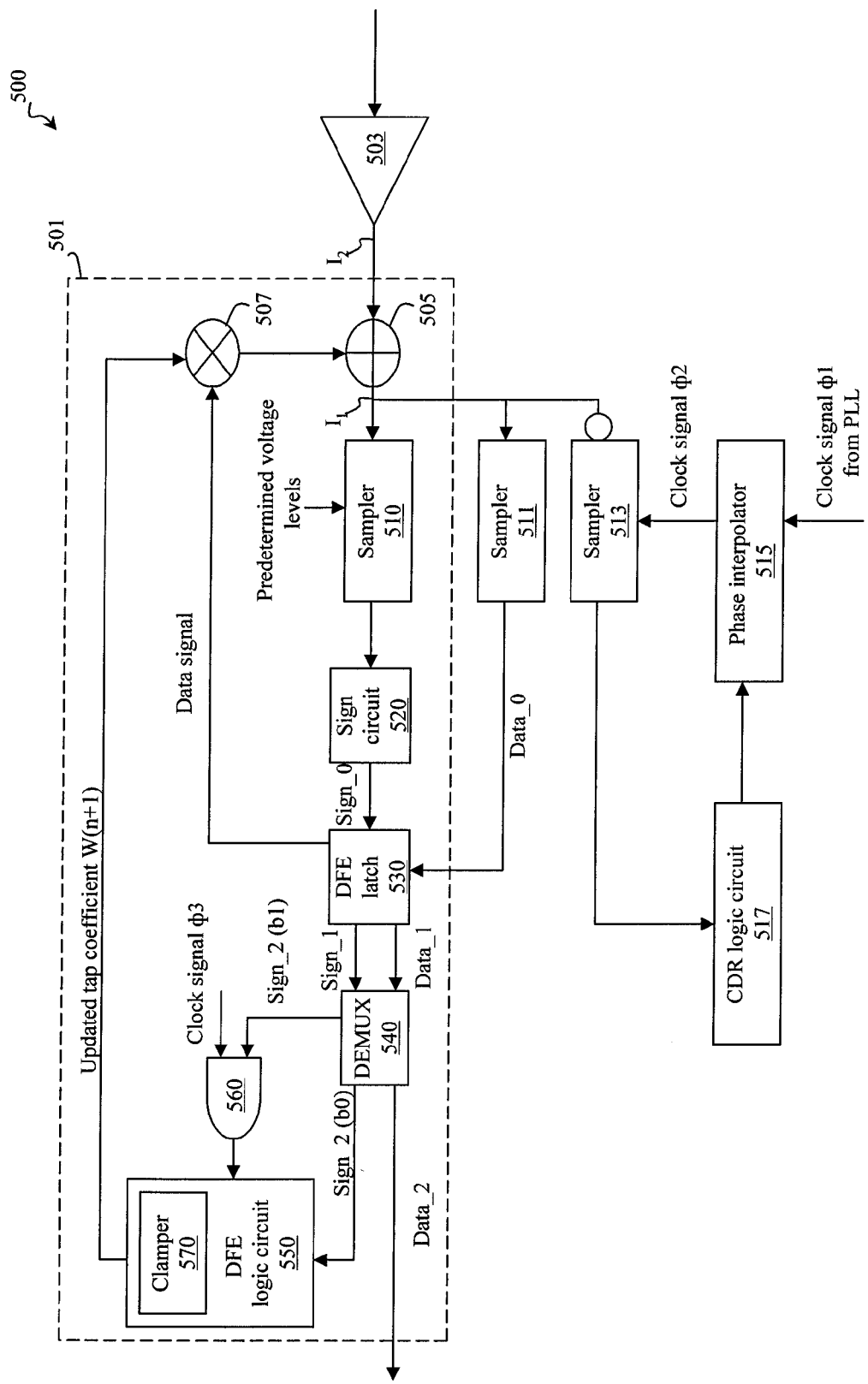
FIG. 5 is a schematic drawing illustrating an exemplary integrated circuit including another exemplary DFE.

FIG. 5 is a schematic drawing illustrating an exemplary integrated circuit including another exemplary DFE. Items of FIG. 5 that are the same items in FIG. 2 are indicated by the same reference numerals, increased by 300. In FIG. 5, a DFE 501 can include a clamper 570. In some embodiments, the clamper 570 can be disposed in a DFE logic circuit 550. The clamper 570 can receive the measured tap coefficient W(n+1) as the updated tap coefficient. The clamper 570 can be configured to determine if the updated tap coefficient W(n+1) is more than a predetermined value, e.g., 0. If the updated tap coefficient W(n+1) is no more than the predetermined value, the clamper 570 can pass the updated tap coefficient W(n+1) that can be fed back to adjust the amplitude of the input signal $I_2$. If the updated tap coefficient W(n+1) is more than the predetermined value, the clamper 570 can clamp the updated tap coefficient W(n+1) at the predetermined value.

For example, if the updated tap coefficient W(n+1) is −0.2, the "−0.2" updated tap coefficient W(n+1) can be fed back to adjust the amplitude of the input signal $I_2$. If the updated tap coefficient W(n+1) is 0.2, the clamper 570 can clamp "0.2" updated tap coefficient W(n+1) at "0" and output "0" as the updated tap coefficient W(n+1) to the multiplier 507. It is noted that the predetermined value "0" described above is merely exemplary. The predetermined value can be modified to achieve a desired deviation of frequency response.

Figure 6:
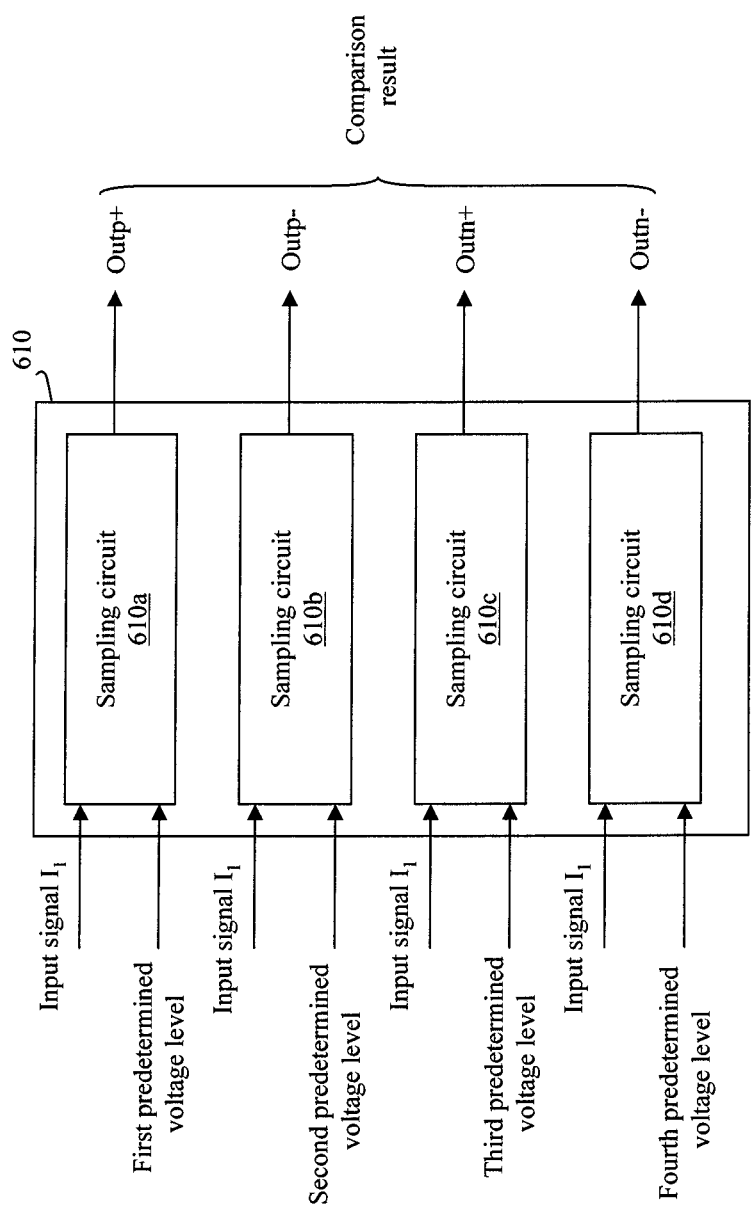
FIG. 6 is a schematic drawing illustrating another exemplary sampler for comparing the amplitude of the input signal with the predetermined voltage levels.

Following is a description regarding a method using another exemplary sampler for determining the updated tap coefficient. FIG. 6 is a schematic drawing illustrating another exemplary sampler for comparing the amplitude of the input signal with the predetermined voltage levels. In FIG. 6, a sampler 610 can be similar to the sampler 210 described above in conjunction with FIG. 2. The sampler 610 can include at least one sampling circuit, e.g., sampling circuits 610a-610d. Each of the sampling circuits 610a-610d can receive the input signal $I_1$. The sampling circuits 610a-610d can receive the first, second, third, and fourth predetermined voltage levels, respectively.

In at least one embodiment, the first predetermined voltage level can be equal to a reference voltage $V_{ref}$ plus a predetermined voltage V, e.g., $V_{ref}+V$. The second predetermined voltage level can be equal to a reference voltage $V_{ref}$ minus a predetermined voltage V, e.g., $V_{ref}-V$. The third predetermined voltage level can be equal to a reference voltage $-V_{ref}$ plus a predetermined voltage V, e.g., $-V_{ref}+V$. The fourth predetermined voltage level can be equal to a reference voltage $-V_{ref}$ minus a predetermined voltage V, e.g., $-V_{ref}-V$. The predetermined voltage V can have a value between about 0.2 $V_{ref}$ and about 0.4 $V_{ref}$.

The sampling circuit 610a can compare the amplitude of the input signal $I_1$ and the first predetermined voltage level, outputting a comparison result Outp+. The sampling circuit 610b can compare the amplitude of the input signal $I_1$ and the second predetermined voltage level, outputting a comparison result Outp−. The sampling circuit 610c can compare the amplitude of the input signal $I_1$ and the third predetermined voltage level, outputting a comparison result Outn+. The sampling circuit 610d can compare the amplitude of the input signal $I_1$ and the fourth predetermined voltage level, outputting a comparison result Outn−. The comparison results Outp+, Outp−, Outn+, and Outn− are outputted to the sign circuit 220 (shown in FIG. 2).

The sign circuit 220 can receive the comparison results Outp+, Outp−, Outn+, and Outn−, outputting at least one sign signal Sign_0, e.g., Sign_0(b0) and Sign_0(b1), corresponding to the comparison results Outp+ and Outp−. FIG. 7A illustrates a table showing relationships between the sign signals Sign_0(b0) and Sign_0(b1) and the comparison results Outp+, Outp−, Outn+, and Outn−. In some embodiments, if the amplitude of the input signal $I_1$ is larger than the first predetermined voltage levels, the sign circuit 220 can output the sign signals Sign_0(b0) and Sign_0(b1) having, for example, a low voltage state "0" and a high voltage state "1", respectively. The DFE logic circuit 250 (shown in FIG. 2) can, corresponding to the sign signals Sign_0(b0) and Sign_0(b1), update a tap coefficient to generate an updated tap coefficient that is fed back to reduce an amplitude of an input signal $I_2$ received at the input end of the DFE 201.

If the amplitude of the input signal $I_1$ is smaller than the first predetermined voltage level and larger than the second predetermined voltage level, the sign circuit 220 can output the sign signals Sign_0(b0) and Sign_0(b1) having, for example, a low voltage state "0" and a low voltage state "0", respectively. The DFE logic circuit 250 is, corresponding to the sign signals Sign_0(b0) and Sign_0(b1), free from updating the tap coefficient.

If the amplitude of the input signal $I_1$ is larger than the third predetermined voltage level and smaller than the second predetermined voltage level, the sign circuit 220 can output the sign signals Sign_0(b0) and Sign_0(b1) having, for example, a high voltage state "1" and a high voltage state "1", respectively. The DFE logic circuit 250 can, corresponding to the sign signals Sign_0(b0) and Sign_0(b1), update a tap coefficient to generate an updated tap coefficient that is fed back to increase the amplitude of an input signal $I_2$ received at the input end of the DFE 201.

If the amplitude of the input signal $I_1$ is larger than the fourth predetermined voltage level and smaller than the third predetermined voltage level, the sign circuit 220 can output the sign signals Sign_0(b0) and Sign_0(b1) having, for example, a low voltage state "0" and a low voltage state "0", respectively. The DFE logic circuit 250 is, corresponding to the sign signals Sign_0(b0) and Sign_0(b1), free from updating the tap coefficient.

If the amplitude of the input signal $I_1$ is smaller than the fourth predetermined voltage level, the sign circuit 220 can output the sign signals Sign_0(b0) and Sign_0(b1) having, for example, a low voltage state "0" and a high voltage state "1", respectively. The DFE logic circuit 250 (shown in FIG. 2) can, corresponding to the sign signals Sign_0(b0) and Sign_0(b1), update a tap coefficient to generate an updated tap coefficient that is fed back to reduce an amplitude of an input signal $I_2$ received at the input end of the DFE 201.

Figure 7B:
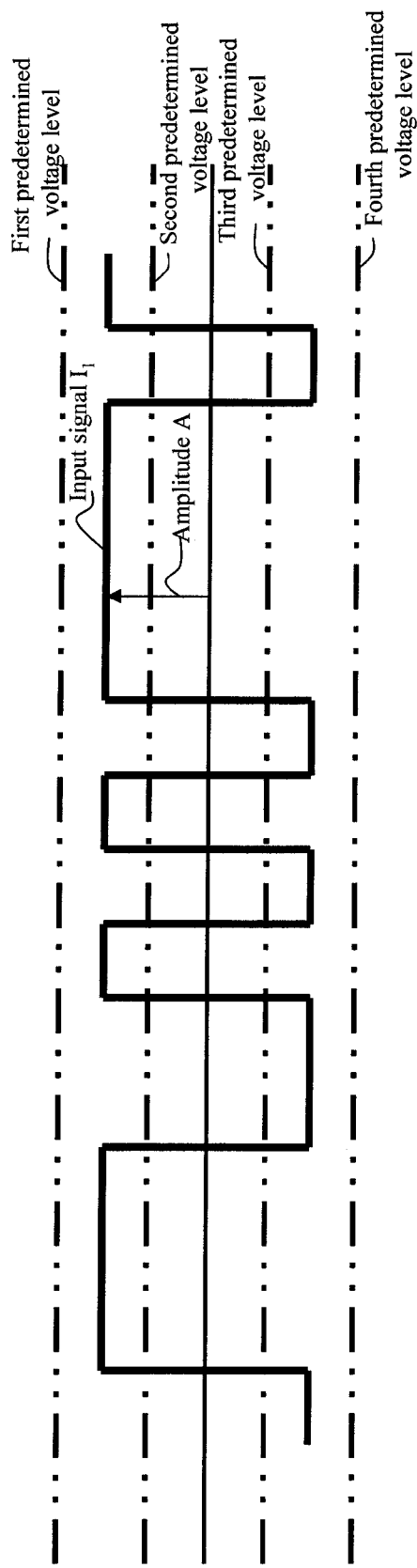
FIG. 7B is a schematic drawing illustrating an exemplary input signal having an amplitude between a first predetermined voltage level and a second predetermined voltage level.

For example, FIG. 7B illustrates the input signal $I_1$ has an amplitude "A". The amplitude "A" is larger than the second predetermined voltage level and smaller than the first predetermined voltage levels. Based on the table shown in FIG. 7A, the sign circuit 220 can output the sign signals Sign_0(b0) and Sign_0(b1) having a low voltage state "0" and a low voltage state "0", respectively. The DFE logic circuit 250 is free from updating the tap coefficient.

Figure 8:
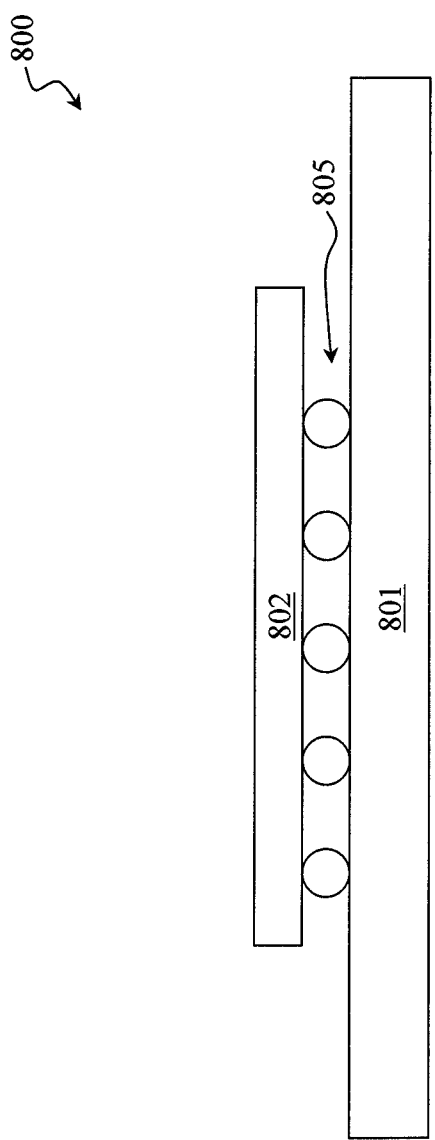
FIG. 8 is a schematic drawing illustrating a system including an exemplary integrated circuit disposed over a substrate board.

FIG. 8 is a schematic drawing illustrating a system including an exemplary integrated circuit disposed over a substrate board. In FIG. 8, a system 800 can include an integrated circuit 802 disposed over a substrate board 801. The substrate board 801 can include a printed circuit board (PCB), a printed wiring board and/or other carrier that is capable of carrying an integrated circuit. The integrated circuit 802 can be similar to the integrated circuit 200 or 500 described above in conjunction with FIGS. 2 and 5, respectively. The integrated circuit 802 can be electrically coupled with the substrate board 801. In some embodiments, the integrated circuit 802 can be electrically coupled with the substrate board 801 through bumps 805. In some other embodiments, the integrated circuit 802 can be electrically coupled with the substrate board 801 through wire bonding. The system 800 can be part of an electronic system such as computers, wireless communication devices, computer-related peripherals, entertainment devices, or the like.

In some embodiments, the system 800 including the integrated circuit 802 can provides an entire system in one IC, so-called system on a chip (SOC) or system on integrated circuit (SOIC) devices. These SOC devices may provide, for example, all of the circuitry needed to implement a cell phone, personal data assistant (PDA), digital VCR, digital camcorder, digital camera, MP3 player, or the like in a single integrated circuit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for updating a tap coefficient of a decision feedback equalizer, the method comprising:
   sampling a first input signal received by the sampler of a decision feedback equalizer; and
   determining a difference between an amplitude of the first input signal and a first predetermined voltage level and a difference between the amplitude of the first input signal and a second predetermined voltage level,
   updating the tap coefficient to generate an updated tap coefficient that is fed back to adjust an amplitude of a second input signal received at an input end of the decision feedback equalizer when the amplitude of the first input signal is greater than both the first predetermined voltage level and the second predetermined voltage level or when the amplitude of the first input signal is less than both the first predetermined voltage level and the second predetermined voltage level, and when the amplitude of the first input signal is between the first predetermined voltage level and the second predetermined voltage level, the tap coefficient is free from being updated.

2. The method of claim 1, wherein when the amplitude of the first input signal is greater than both the first predetermined voltage level and the second predetermined voltage level or is less than both the first predetermined voltage level and the second predetermined voltage level, the tap coefficient is updated to generate the updated tap coefficient that is fed back to adjust the amplitude of the second input signal comprises:
when the amplitude of the first input signal is larger than the first predetermined voltage level and the second predetermined voltage level, the tap coefficient is decreased to reduce the amplitude of the second input signal, and
when the amplitude of the first input signal is smaller than the first predetermined voltage level and the second predetermined voltage level, the tap coefficient is increased to enhance the amplitude of the second input signal.

3. The method of claim 1 further comprising:
determining when the updated tap coefficient is larger than a predetermined value, wherein
when the updated tap coefficient is no more than the predetermined value, the updated tap coefficient is fed back to adjust the amplitude of the second input signal; and
when the updated tap coefficient is larger than the predetermined value, the updated tap coefficient is clamped at the predetermined value.

4. The method of claim 1, wherein the first predetermined voltage level is equal to a reference voltage $V_{ref}$ plus a predetermined voltage V and the second predetermined voltage level is equal to the reference voltage $V_{ref}$ minus the predetermined voltage V.

5. The method of claim 4, wherein the predetermined voltage V has a value between $0.2*V_{ref}$ and $0.4*V_{ref}$.

6. The method of claim 1, wherein the first predetermined voltage level is equal to a reference voltage $-V_{ref}$ plus a predetermined voltage V and the second predetermined voltage level is equal to the reference voltage $-V_{ref}$ minus the predetermined voltage V.

7. The method of claim 1, wherein the method is free from including a training sequence for the decision feedback equalizer.

8. A method for updating a tap coefficient of a decision feedback equalizer, the method comprising:
sampling a first input signal received by a sampler of the decision feedback equalizer; and
comparing an amplitude of the first input signal with a first predetermined voltage level, with a second predetermined voltage level, with a third predetermined voltage level and with a fourth predetermined voltage level,
updating the tap coefficient to generate an updated tap coefficient that is fed back to adjust an amplitude of a second input signal received at an input end of the decision feedback equalizer when
(a) the amplitude of the first input signal is greater than each of the first predetermined voltage level, the second predetermined voltage level, the third predetermined voltage level and the fourth predetermined voltage level,
(b) the amplitude of the first input signal is less than the first predetermined voltage level and the second predetermined voltage level, and the amplitude of the first input signal is greater than the third predetermined voltage level and the fourth predetermined voltage level, or
(c) the amplitude of the first input signal is smaller than each of the first predetermined voltage level, the second predetermined voltage level, the third predetermined voltage level and the fourth predetermined voltage level, and
when the amplitude of the first input signal is between the first predetermined voltage level and second predetermined voltage level or between the third predetermined voltage level and the fourth predetermined voltage level, the tap coefficient is free from being updated.

9. The method of claim 8, wherein when the amplitude of the first input signal satisfies condition (a), (b), or (c), a tap coefficient is updated to generate an updated tap coefficient that is fed back to adjust an amplitude of a second input signal received from the input end comprises:
when the amplitude of the first input signal is larger than the first predetermined voltage level or smaller than the fourth predetermined voltage level, the tap coefficient is decreased to reduce the amplitude of the second input signal, and
when the amplitude of the first input signal is smaller than the second predetermined voltage level and larger than the third predetermined voltage level, the tap coefficient is increased to enhance the amplitude of the second input signal.

10. The method of claim 8, wherein the first predetermined voltage level is equal to a first reference voltage $V_{ref}$ plus a predetermined voltage V, the second predetermined voltage level is equal to the first reference voltage $V_{ref}$ minus the predetermined voltage V, the third predetermined voltage level is equal to a second reference voltage $-V_{ref}$ plus the predetermined voltage V, and the fourth predetermined voltage level is equal to the second reference voltage $-V_{ref}$ minus the predetermined voltage V.

11. The method of claim 10, wherein the predetermined voltage V has a value between $0.2*V_{ref}$ and $0.4*V_{ref}$.

12. The method of claim 8, wherein the method is free from including a training sequence for the decision feedback equalizer.

13. A decision feedback equalizer (DFE) comprising:
at least one sampler, the at least one sampler configured to sample a first input signal for comparing an amplitude of the first input signal with a first predetermined voltage level and a second predetermined voltage level that define a range and outputting at least one comparison result;
a sign circuit coupled with the at least one sampler, the sign circuit configured to output at least one first sign signal corresponding to the at least one comparison result; and
a DFE logic circuit, the DFE logic circuit configured to update a tap coefficient corresponding to the at least one first sign signal, wherein
when the at least one first sign signal representing the amplitude of the first input signal falls outside the range, the DFE logic circuit is configured to update the tap coefficient to generate an updated tap coefficient that is fed back to adjust an amplitude of a second input signal received from an input end of the decision feedback equalizer, and
when the at least one first sign signal representing the amplitude of the first input signal falls inside the range, the DFE logic circuit is free from updating the tap coefficient.

14. The decision feedback equalizer of claim 13, wherein when the at least one first sign signal representing the amplitude of the first input signal falls outside the range, the DFE logic circuit is configured to update the tap coefficient to generate an updated tap coefficient that is fed back to adjust an amplitude of a second input signal comprises:
when the at least one first sign signal representing the amplitude of the first input signal is larger than the first predetermined voltage level and the second predetermined voltage level, the DFE logic circuit is configure to reduce the tap coefficient to reduce the amplitude of the second input signal, and
when the at least one first sign signal representing the amplitude of the first input signal is smaller than the first predetermined voltage level and the second predetermined voltage level, the DFE logic circuit is configured to increase the tap coefficient to enhance the amplitude of the second input signal.

15. The decision feedback equalizer of claim 13, wherein the first predetermined voltage level is equal to a reference voltage $V_{ref}$ plus a predetermined voltage V and the second predetermined voltage level is equal to the reference voltage $V_{ref}$ minus the predetermined voltage V.

16. The decision feedback equalizer of claim 15, wherein the predetermined voltage V has a value between $0.2*V_{ref}$ and $0.4*V_{ref}$.

17. The decision feedback equalizer of claim 13, wherein the first predetermined voltage level is equal to a reference voltage $-V_{ref}$ plus a predetermined voltage V and the second predetermined voltage level is equal to the reference voltage $-V_{ref}$ minus the predetermined voltage V.

18. The decision feedback equalizer of claim 13 further comprising:
a clamper that is configured to receive the updated tap coefficient, wherein
when the updated tap coefficient is no more than a predetermined value, the clamper is configured to pass the updated tap coefficient to adjust the amplitude of the second input signal; and
when the updated tap coefficient is larger than the predetermined value, the clamper is configured to clamp the updated tap coefficient at the predetermined value.

19. The decision feedback equalizer of claim 13 further comprising a logic gate coupled with the DFE logic circuit, wherein the logic gate is configured to receive a clock signal and a second sign signal corresponding to the at least one first sign signal to control the DFE logic circuit updating the tap coefficient.

20. The method of claim 1, wherein determining the difference between the amplitude of the first input signal and the first predetermined voltage level comprises using a first sampling circuit, and determining the difference between the amplitude of the first input signal and the second predetermined voltage level comprises using a second sampling circuit different from the first sampling circuit.

* * * * *